US010527177B2

(12) United States Patent
Vu

(10) Patent No.: US 10,527,177 B2
(45) Date of Patent: Jan. 7, 2020

(54) CONTROL PLATE IN A VALVE

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 0 days.

(21) Appl. No.: 16/211,957

(22) Filed: Dec. 6, 2018

(65) Prior Publication Data
US 2019/0170261 A1 Jun. 6, 2019

Related U.S. Application Data

(62) Division of application No. 15/204,245, filed on Jul. 7, 2016, now abandoned.
(Continued)

(51) Int. Cl.
F16K 7/14 (2006.01)
F16K 41/10 (2006.01)
(Continued)

(52) U.S. Cl.
CPC ............ F16K 1/36 (2013.01); B29C 37/0085 (2013.01); B29C 70/80 (2013.01); F16K 1/46 (2013.01);
(Continued)

(58) Field of Classification Search
CPC ..... F16K 1/04; F16K 1/36; F16K 1/46; F16K 1/487; F16K 1/50; F16K 25/005; F16K 27/0236; F16K 27/102; F16K 31/145; F16K 31/365; F16K 31/385; F16K 31/3855; F16K 31/508; F16K 41/10; F16K 41/103; F16K 41/106; F16K 41/12; F16K 7/12;
(Continued)

(56) References Cited

U.S. PATENT DOCUMENTS 594,895 A * 12/1897 O'Meara ................... F16K 1/42
137/329.02
2,595,012 A 4/1952 Smith
(Continued)

FOREIGN PATENT DOCUMENTS

CN 101328980 A 12/2008
CN 101680559 A 3/2010
(Continued)

OTHER PUBLICATIONS

First Office Action of the State Intellectual Property Office of the People's Republic of China from corresponding CN Application Serial No. 201680040357.X dated Feb. 2, 2019.
(Continued)

Primary Examiner — Hailey K. Do
(74) Attorney, Agent, or Firm — Lando & Anastasi, LLP

(57) ABSTRACT

A control plate for effecting superior shut-off in a proportional control valve comprises a moveable disk-shaped element that has a flat surface, generally perpendicular to the valve axis of symmetry when closed, and translates toward or away from an orifice surrounded by a narrow lip or orifice ridge. Enhanced leak tightness in the valve shut-off condition is achieved by selectively incorporating into the control plate materials that are softer than the material comprising the orifice ridge.

17 Claims, 7 Drawing Sheets

Related U.S. Application Data

(60) Provisional application No. 62/292,526, filed on Feb. 8, 2016, provisional application No. 62/190,478, filed on Jul. 9, 2015.

(51) Int. Cl.

| | | |
|---|---|---|
| *F16K 27/02* | (2006.01) | |
| *F16K 1/36* | (2006.01) | |
| *F16K 41/12* | (2006.01) | |
| *F16K 1/46* | (2006.01) | |
| *F16K 25/00* | (2006.01) | |
| *B29C 37/00* | (2006.01) | |
| *B29C 70/80* | (2006.01) | |
| *F16K 27/10* | (2006.01) | |

(52) U.S. Cl.
CPC .............. *F16K 7/14* (2013.01); *F16K 25/005* (2013.01); *F16K 27/0236* (2013.01); *F16K 41/103* (2013.01); *F16K 41/12* (2013.01); *F16K 27/102* (2013.01)

(58) Field of Classification Search
CPC ..... F16K 7/14; F16K 7/16; F16K 7/17; F16K 5/0407; F16K 5/0471; F16K 5/0478; F16K 7/20; F16K 31/0641; F16K 31/52491
See application file for complete search history.

(56) References Cited

U.S. PATENT DOCUMENTS

| | | | |
|---|---|---|---|
| 2,924,233 A * | 2/1960 | Michaels | ............... F16K 41/12 137/315.07 |
| 3,278,156 A | 10/1966 | Callahan et al. | |
| 3,295,191 A | 1/1967 | Gallagher et al. | |
| 3,438,391 A | 4/1969 | Yocum | |
| 4,124,676 A | 11/1978 | Henzl | |
| 4,343,754 A | 8/1982 | Wilde et al. | |
| 4,582,294 A * | 4/1986 | Fargo | ................. F16K 31/0624 137/625.65 |
| 4,606,374 A | 8/1986 | Kolenc et al. | |
| 4,671,490 A | 6/1987 | Kolenc et al. | |
| 4,732,363 A | 3/1988 | Kolenc et al. | |
| 4,778,640 A | 10/1988 | Braun et al. | |
| 4,872,638 A * | 10/1989 | Thompson | .......... F16K 31/1262 251/54 |
| 4,904,430 A | 2/1990 | Yamada | |
| 4,964,423 A | 10/1990 | Gausman et al. | |
| 4,977,916 A | 12/1990 | Ohmi et al. | |
| 5,145,147 A | 9/1992 | Nakazawa et al. | |
| 5,201,492 A | 4/1993 | Beauvir | |
| 5,279,328 A | 1/1994 | Linder et al. | |
| 5,533,543 A | 7/1996 | Semeia | |
| 5,722,638 A | 3/1998 | Miller et al. | |
| 5,725,007 A * | 3/1998 | Stubbs | .................... F16K 41/12 137/15.18 |
| 5,730,423 A | 3/1998 | Wu et al. | |
| 5,743,513 A | 4/1998 | Yoshikawa et al. | |
| 5,755,428 A | 5/1998 | Ollivier | |
| 5,820,105 A | 10/1998 | Yamaji et al. | |
| 5,851,004 A | 12/1998 | Wu et al. | |
| 5,927,325 A | 7/1999 | Bensaoula et al. | |
| 6,123,320 A | 9/2000 | Rasanow et al. | |
| 6,354,565 B1 * | 3/2002 | Doust | ....................... F16K 1/36 251/175 |
| 7,401,762 B2 | 7/2008 | Ohmori et al. | |
| 7,441,560 B2 * | 10/2008 | Sonoda | .................... F16K 1/36 137/375 |
| 7,513,483 B1 | 4/2009 | Blume | |
| 7,591,281 B2 | 9/2009 | Tsuge | |
| 8,070,132 B2 | 12/2011 | Hall | |
| 8,420,817 B2 | 4/2013 | Giraud et al. | |
| 9,022,347 B2 | 5/2015 | Tatarek | |
| 2003/0030020 A1 | 2/2003 | Fukano | |
| 2003/0178427 A1 | 9/2003 | Chomik | |
| 2003/0183789 A1 | 10/2003 | Kerg et al. | |
| 2005/0104021 A1 | 5/2005 | Meyers | |
| 2005/0224744 A1 | 10/2005 | Newberg | |
| 2006/0169941 A1 | 8/2006 | Glime | |
| 2006/0174945 A1 | 8/2006 | Maula et al. | |
| 2007/0200082 A1 | 8/2007 | Crockett et al. | |
| 2008/0073605 A1 | 3/2008 | Ishigaki et al. | |
| 2008/0290312 A1 | 11/2008 | Hirose et al. | |
| 2010/0096578 A1 | 4/2010 | Franz et al. | |
| 2014/0084202 A1 | 3/2014 | Mevius | |
| 2014/0190578 A1 | 7/2014 | Hayashi | |
| 2015/0059877 A1 * | 3/2015 | Vu | ......................... F16K 27/029 137/487.5 |
| 2015/0129791 A1 | 5/2015 | Okita et al. | |
| 2016/0138730 A1 | 5/2016 | Vu | |

FOREIGN PATENT DOCUMENTS

| | | |
|---|---|---|
| CN | 104350317 A | 2/2015 |
| DE | 4134430 C1 | 2/1993 |
| EP | 1610044 A2 | 12/2005 |
| EP | 1676067 A2 | 7/2006 |
| EP | 2711594 A1 | 3/2014 |
| GB | 1073998 A | 6/1967 |
| GB | 2517451 A | 2/2015 |
| JP | S552879 A | 1/1980 |
| JP | 2000266230 A | 9/2000 |
| JP | 2002089725 A | 3/2002 |
| JP | 2003529031 A | 9/2003 |
| JP | 2006090386 A | 4/2006 |
| JP | 2007509291 A | 4/2007 |
| JP | 2008286361 A | 11/2008 |
| JP | 2011202681 A | 10/2011 |
| JP | 2014132188 A | 7/2014 |
| JP | 2014190452 A | 10/2014 |
| WO | 0204217 A1 | 1/2002 |
| WO | 2005038320 A2 | 4/2005 |
| WO | 2013008010 A1 | 1/2013 |
| WO | 2014188785 A1 | 11/2014 |

OTHER PUBLICATIONS

Examination Report of the European Patent Office from corresponding EP Application Serial No. 168219541 dated Mar. 13, 2019.
International Search Report and Written Opinion from corresponding International Application No. PCT/US2016/041263 dated Sep. 12, 2016.
Extended European Search Report from European Application No. 16821954.1 dated Jun. 19, 2018.
Office Action from European Application No. 16821954.1 dated Jul. 4, 2018.

* cited by examiner

CONTROL PLATE IN A VALVE

CROSS-REFERENCE TO RELATED APPLICATIONS

This application is a divisional of pending U.S. patent application Ser. No. 15/204,245 titled "CONTROL PLATE IN A VALVE," filed Jul. 7, 2016, which claims the benefit under 35 U.S.C. § 119(e) to U.S. Provisional Application Ser. No. 62/190,478 titled "CONTROL PLATE IN A VALVE," filed Jul. 9, 2015, and Provisional Application Ser. No. 62/292,526 titled "CONTROL PLATE IN A VALVE," filed Feb. 8, 2016, each of which is incorporated by reference herein in its entirety for all purposes.

BACKGROUND

The present invention is related to a moveable portion of a fluid control valve that may be actively positioned, anywhere between an extreme open condition and an extreme closed condition, to adjust a flow of fluid passing therethrough. The invention is particularly useful in valves intended for proportional or modulating control of fluid delivery within industrial processes making semiconductor devices, pharmaceuticals, or fine chemicals, and many similar high-purity fluid delivery systems that simultaneously demand a leak-tight shut-off in the fully closed condition along with proportional control. Many combinations of metallic and elastomeric elements enhancing valve shut-off are known in the art.

SUMMARY

Applicant has invented uniquely manufacturable configurations of a moveable valve element suited for use with various sized valve orifices. The moveable disk-shaped element has a flat surface generally perpendicular to the valve axis of symmetry when closed and translates toward or away from an orifice surrounded by a narrow lip or orifice ridge. This combination of valve structures is sometimes referred to as being the jet & seat class of fluid pathway element combinations. In this disclosure the flat surfaced element (colloquially a seat) which closes against the narrow lip (colloquially a jet) surrounding the orifice is often referred to as a control plate. Enhanced leak tightness in the valve shut-off condition is provided by selectively incorporating into the control plate materials that are softer than the material comprising the lip or ridge surrounding the orifice. Control plate materials being softer than the orifice ridge-lip allows elastic deformation of the control plate surface as it presses against the orifice ridge-lip and thereby enhances the sealing effected between the control plate and the orifice ridge-lip. The disclosed arrangements can use welding or interference press-fit pieces to avoid problems associated with having threads within high purity fluid pathways.

One embodiment comprises a metallic seat housing having a small diameter central insert of polymer material held in place by a metallic retaining ring pressed into a gap between the outside diameter of the polymer insert and the inside diameter of a seat housing counterbore. Another embodiment comprises a ring of polymer material held in place by a metallic retaining ring pressed into a gap between the inside diameter of the polymer ring and the small internal diameter of a trepanned channel in the control plate, and a metallic retaining ring pressed into the gap between the outside diameter of the polymer ring and the large internal diameter of the trepanned channel in the control plate. Another embodiment comprises a small diameter central insert of a corrosion resistant Nickel alloy typically retained by welding to the larger control plate. Another embodiment comprises a control plate substantially made of a corrosion resistant Nickel alloy with a cover piece optionally made from another alloy.

In one aspect of the present disclosure, a valve control plate is provided that is configured to sealingly engage a fluid conduit opening surrounded by a planar orifice ridge. The valve control plate comprises a valve control plate body and a valve seat insert. The valve control plate body is formed from a first material having a first hardness, the valve control plate body having a first surface configured to face toward the fluid conduit opening. The valve control plate body has a recess defined in the first surface of the valve control plate body. The valve seat insert is formed from a second material having a second hardness that is less than the first hardness, the valve seat insert having a first surface configured to face toward the fluid conduit opening and sealingly engage the planar orifice ridge, the valve seat insert being received in the recess.

In some embodiments, the recess is one of a counterbore or a trepanned groove.

In some embodiments, a volume of the second material is smaller than a volume of the first material.

In some embodiments, the first material is a metal, the recess is a counterbore defined in the first surface of the valve control plate body, the second material is a polymer material, and the valve seat insert is retained in the counterbore by a retaining ring located at an outer periphery of the valve seat insert. In accordance with an exemplary embodiment, the valve seat insert may be configured to engage a planar orifice ridge having a diameter of 4 mm or less.

In some embodiments, the second material is a polymer material, the recess is a trepanned groove defined in the first surface of the valve control plate body, the valve seat insert is ring-shaped, and the first material is a metal. In some embodiments, the valve seat insert is retained in the trepanned groove by an inner retaining ring located at an inner periphery of the valve seat insert and an outer retaining ring located at an outer periphery of the valve seat insert. In other embodiments, the valve seat insert is retained in the trepanned groove by posts, columns, and/or bridges. In accordance with an exemplary embodiment, the valve seat insert may be configured to engage a planar orifice ridge having a diameter of 4 mm or greater.

In some embodiments, the first material is a first metal, the recess is a counterbore defined in the first surface of the control plate body, the second material is a second metal different from the first metal, and the valve seat insert is retained in the counterbore by welding the valve seat insert to the control plate body. In accordance with an exemplary embodiment, the valve seat insert may be configured to engage a planar orifice ridge having a diameter of 4 mm or less.

In some embodiments, a region of the first surface of the valve seat insert that sealingly engages the planar orifice ridge is planar.

In another aspect of the present disclosure, a valve bonnet for use with a control valve body is provided. The control valve body is formed from a first material having a first hardness and has a fluid conduit opening surrounded by a planar orifice ridge. The valve bonnet comprises a bonnet body, a valve diaphragm in sealing engagement with the bonnet body at an outer periphery of the valve diaphragm, a control shaft secured to the diaphragm, the control shaft having a shank projecting from the control shaft, and a valve control plate. The valve control plate is secured to the shank and at least a portion of the valve control plate is formed from a second material having a second hardness that is less than the first hardness, the at least a portion of the valve control plate being configured to sealingly engage the planar orifice ridge. In some embodiments, the at least a portion of the valve control plate is configured to engage a planar orifice ridge that is one of circular and non-circular. In some embodiments, the valve diaphragm is formed integrally with the bonnet body and the control shaft is integrally formed with the diaphragm. In other embodiments, the diaphragm is formed separately from the bonnet body and is welded to the bonnet body.

In some embodiments, the valve control plate further includes a valve control plate body having a trepanned groove defined in the valve control plate body, and the at least a portion of the valve control plate is a valve seat insert that fills the trepanned groove. In some embodiments, the valve seat insert is molded into the trepanned groove, and in some embodiments, the valve seat insert is retained in the trepanned groove by posts, columns, and/or bridges.

In another aspect of the present disclosure, a control valve is provided. The control valve comprises a valve body, a bonnet body secured to the valve body, a valve diaphragm, a control shaft, and a valve control plate. The valve body has a fluid inlet conduit terminating at a first fluid conduit opening, a fluid outlet conduit commencing at a second fluid conduit opening, and an orifice ridge formed from a first material having a first hardness and surrounding the first fluid conduit opening. The valve diaphragm is in sealing engagement with the bonnet body at an outer periphery of the valve diaphragm. The control shaft is secured to the diaphragm, and a shank projects from the control shaft. The valve control plate is secured to the shank and at least a portion of the valve control plate is formed from a second material having a second hardness that is less than the first hardness, the at least a portion of the valve control plate being configured to sealingly engage the orifice ridge.

In some embodiments, the orifice ridge is circular or non-circular.

In some embodiments, the valve control plate includes a valve control plate body having a trepanned groove defined in the valve control plate body, and the at least a portion of the valve control plate is a valve seat insert that fills the trepanned groove. In some embodiments, the valve seat insert is molded into the trepanned groove, and in some embodiments, the valve seat insert is retained in the trepanned groove by posts, columns, and/or bridges.

DETAILED DESCRIPTION

Figure 1:
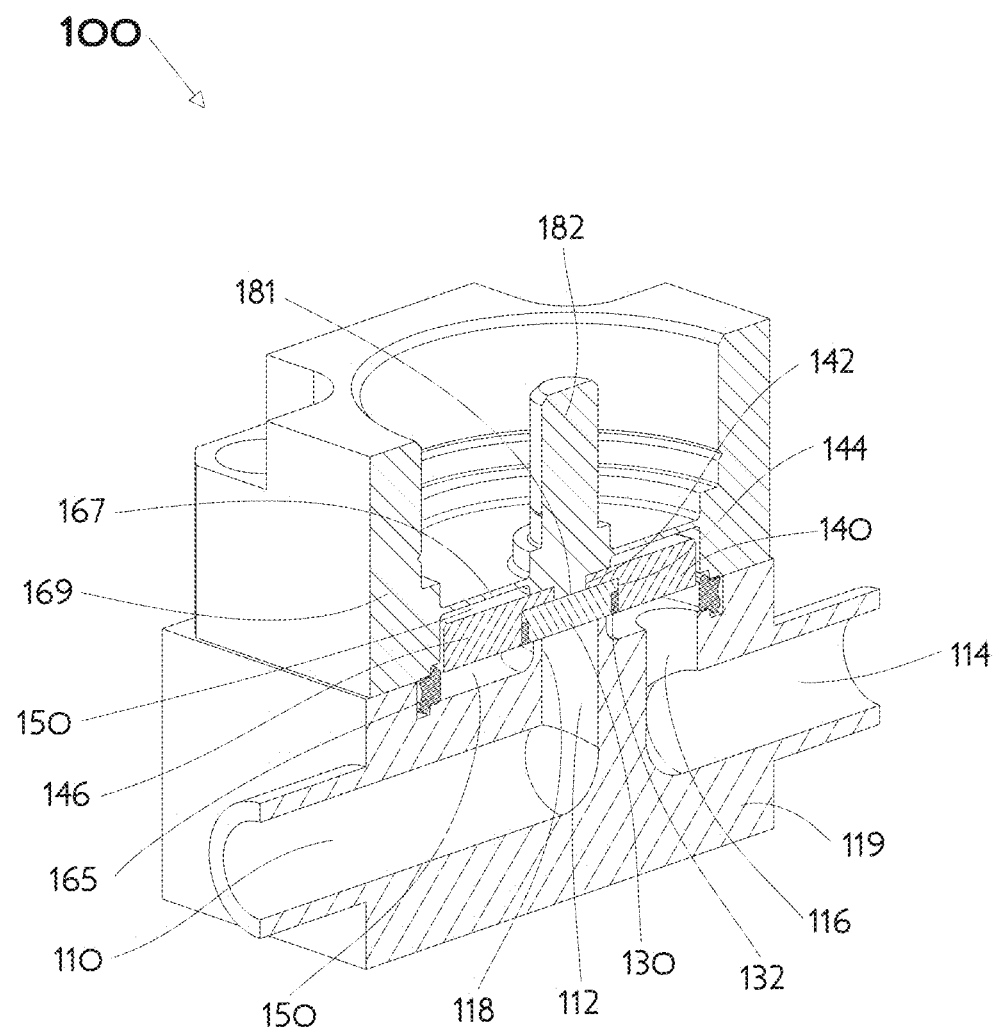
FIG. 1 is a cross-sectioned perspective view of a representative valve with a control plate having a polymer material insert and a small orifice ridge of maximal span.

Embodiments of the present invention are not limited in their application to the details of construction and the arrangement of components set forth in the following description or illustrated in the drawings. Aspects of the present invention are capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting. In the following design discussions fluid flow is typically described as proceeding from a first fluid conduit, through the controlling portion of the valve, and then through a second fluid conduit. Designers will of course appreciate the discussed direction is merely a matter of descriptive convenience, fluid flow may proceed in an opposite sequence, and should not be considered as limiting.

In most current high purity valve designs a diaphragm type of moveable sealing structure is the preferred approach. Using a diaphragm to contain a controlled fluid, while allowing easy motion of a moveable control element, has become standard practice. In many such valve designs the diaphragm serves as the moveable control element and valve shut-off is achieved by having the diaphragm itself press against a narrow ring of polymer material surrounding a fluid conduit opening. Designers making valves intended for proportional, or modulating, control of fluid delivery within industrial processes making semiconductor devices may find direct contacting type diaphragm valves have insufficiently gradual control curves. One type of known alternative design has a substantially flat control plate moving toward or away from a metallic lip or orifice ridge surrounding a fluid conduit opening. Complications may however arise when the diaphragm itself is not the element best suited to blocking fluid flow through the valve and shut-off sealing against a metallic structure can be problematic.

FIG. 1 illustrates a representative example of a proportional control valve 100 using diaphragm sealing and also having a control plate 140 which abuts an orifice ridge 118 surrounding a centrally located fluid conduit opening 112. The proportional control valve 100 comprises a valve body 119 having a first fluid conduit 110 and a second fluid conduit 114, each of which communicates fluid to or from a valve chamber 150, and a valve bonnet (bonnet body) 169 sealed to the valve body 119 by a gasket 165, the bonnet 169 having a diaphragm 167 allowing movement of the attached control plate 140 within the valve chamber 150. The manner of controlling fluid flow may be further understood by considering the fluid conduit opening 112, in fluid communication with the first fluid conduit 110 and surrounded by the orifice ridge 118, whereby at least a portion of the control plate 140 may be moved toward or away from the orifice ridge 118 to create a small clearance control gap (not shown) through which fluid may controllably flow. The controllable fluid flow may transit into the valve chamber 150 from whence it may exit through an offset fluid conduit opening 116 in fluid communication with the second fluid conduit 114. In the present example valve 100, an actuator (not shown) may apply a retracting force to a control shaft 182 to deflect the diaphragm 167 and thereby modulate the conductance through the valve by changing the control gap. In the present FIG. 1 illustration the valve 100 is completely closed in a no-flow condition so there is no control gap shown.

Achieving leak-free valve shut-off when the control plate 140 contacts the orifice ridge 118 may be difficult and moreover the criteria for what constitutes leak-free operation may differ among design applications. For example, not producing any gas bubbles when the valve outlet is submerged in water might be sufficient in one circumstance while having a helium gas leak rate less than 10e-9 sccm/sec might be required for another situation. A valve design having a polymer material contact a metallic material upon closure is known to generally provide among the most leak-tight of shut-off arrangements. But polymer materials usually absorb moisture and consequently in high purity applications it is desirable to minimize the total amount of polymer material exposed to the controlled fluid. In the representative proportional control valve 100 this goal of reducing polymer content is achieved by creating a control plate 140 comprising a metallic control plate body 146 and an insert 130 of polymer material having a relatively small volume. The orifice ridge 118 may be considered as having a "maximal span" relative to the polymer insert 130 in that the orifice ridge engages the polymer insert adjacent an outer periphery of the insert.

A metallic control plate body 146 of the control plate 140 can be machined as a flat disk having a central thru-hole 142 with a counterbore 144 on the side intended to face the central fluid conduit opening 112. The counterbore 144 will enable the metallic control plate body 146 to function as a seat housing whereby a polymer seat insert 130 may be retained therein to provide a more compliant sealing material of reduced volume. In manufacturing the illustrated valve design 100 the control plate body 146 is placed onto a shank 181, projecting from the control shaft 182 and diaphragm 167, which passes through the central thru-hole 142. The shank 181 and control plate body 146 may be welded together at the central thru-hole 142 interface using electron beam, laser, TIG, or any equivalent welding process. Any resulting minor weld bead excess may be machined off to match the bottom of the counterbore 144. The polymer material insert 130 may subsequently be placed into the counterbore 144 and held in place by inserting a metallic retaining ring 132 into a space around the outer periphery of the polymer material insert 130 within the outer diameter of the counterbore 144. The complete assembly may then undergo final finishing for flatness (by lapping, for example) as needed for good valve function. This design approach is especially advantageous for valves having an orifice ridge of about 4 mm diameter or less.

The polymer material insert 130 includes a planar first surface configured to sealingly engage the planar upper end of the orifice ridge 118.

Figure 2:
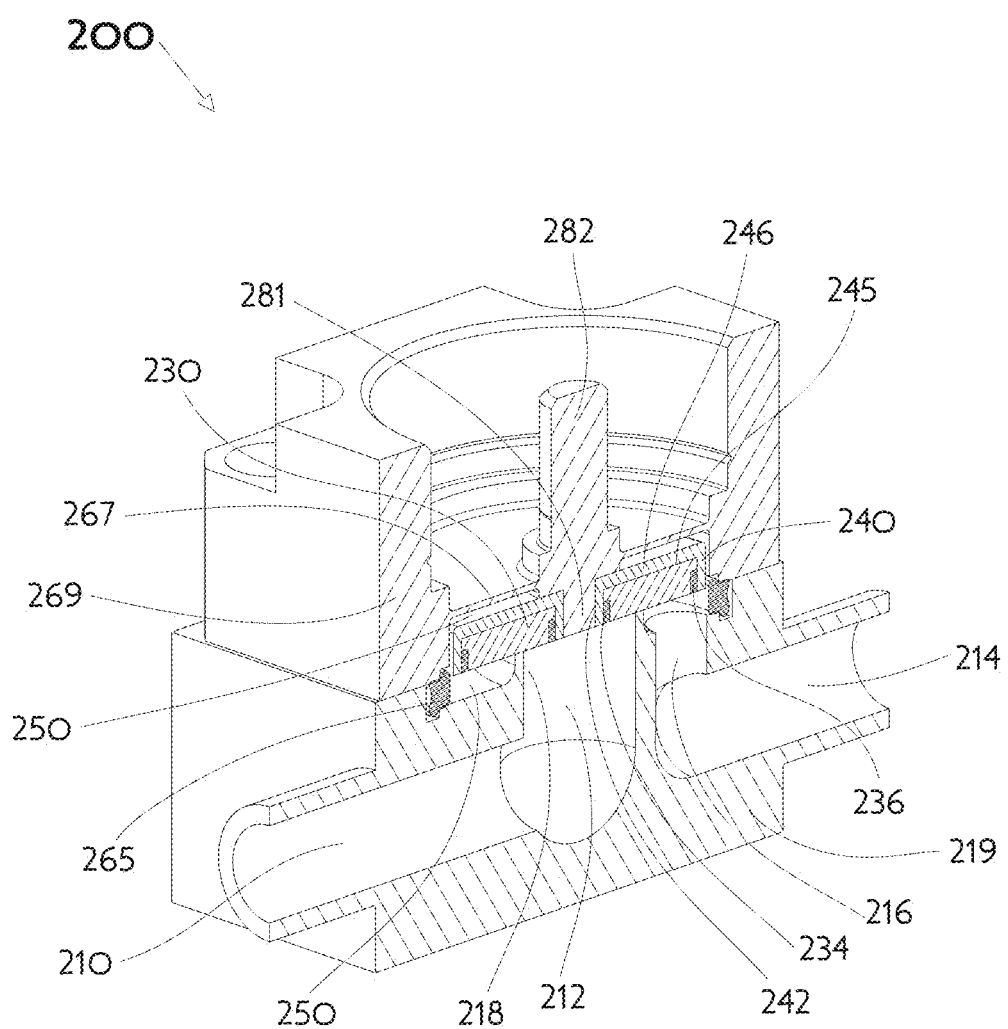
FIG. 2 is a cross-sectioned perspective view of a representative valve with a control plate having a polymer material insert and a large orifice ridge of typical span.

FIG. 2 illustrates a representative example of a proportional control valve 200 using diaphragm sealing and also having a control plate 240 which abuts an orifice ridge 218 surrounding a central fluid conduit opening 212. The proportional control valve 200 comprises a valve body 219 having a first fluid conduit 210 and a second fluid conduit 214, each of which communicates fluid to or from a valve chamber 250, and a valve bonnet 269 sealed to the valve body 219 by a gasket 265, the bonnet 269 having a diaphragm 267 allowing movement of the attached control plate 240 within the valve chamber 250. The manner of controlling fluid flow may be further understood by considering the fluid conduit opening 212, in fluid communication with the first fluid conduit 210 and surrounded by the orifice ridge 218, whereby at least a portion of the control plate 240 may be moved toward or away from the orifice ridge 218 to create a small clearance control gap (not shown) through which fluid may controllably flow. The controllable fluid flow may transit into the valve chamber 250 from whence it may exit through an offset fluid conduit opening 216 in fluid communication with the second fluid conduit 214. In the present example valve 200, an actuator (not shown) may apply a retracting force to a control shaft 282 to deflect the diaphragm 267 and thereby modulate the conductance through the valve by changing the control gap. In the present FIG. 2 illustration the valve 200 is completely closed in a no-flow condition so there is no control gap shown.

In the representative proportional control valve 200 the goal of reducing polymer content is achieved by creating a control plate 240 comprising a metallic control plate body 246 and a ring-shaped insert 230 of polymer material having a relatively small volume. The orifice ridge 218 may be considered as having a "typical span" relative to the ring-shaped insert 230 in that the orifice ridge engages the insert adjacent a more central region of the insert 230 located between an inner periphery and an outer periphery of the insert. It should be appreciated that FIG. 2 is not drawn to scale, and that the volume of the polymer can be less than that illustrated in at least some embodiments. The metallic control plate body 246 of the control plate 240 can be machined as a flat disk having a central thru-hole 242 and a trepanned (i.e., ring-shaped) groove 245 on the side intended to face the central fluid conduit opening 212. The trepanned groove 245 will enable the metallic control plate body 246 to function as a seat housing whereby a polymer material insert 230 may be retained therein to provide a more compliant sealing material of reduced volume. In manufacturing the illustrated valve design 200 the ring-shaped polymer material insert 230 may be placed into the trepanned groove 245 and held in place by inserting a metallic inner retaining ring 234 into a space around the inner diameter of the trepanned groove 245 within the inner diameter of the ring-shaped polymer insert 230, and inserting a metallic outer retaining ring 236 into a space around the outer periphery of the ring-shaped polymer insert 230 within the outer diameter of the trepanned groove 245. The control plate 240 is subsequently placed onto a shank 281, projecting from the control shaft 282 and diaphragm 267, which passes through the central thru-hole 242. The shank 281 and control plate body 246 may be welded together at the central thru-hole 242 interface using electron beam, laser, TIG, or any equivalent welding process. Any resulting minor weld bead excess may be machined off the control plate 240 surface as well as any splatter on the ring-shaped polymer insert 230. The complete assembly may then undergo final finishing for flatness (by lapping, for example) as needed for good valve function. This design approach is especially advantageous for valves having an orifice ridge maximal span greater than about 4 mm. It should be appreciated the orifice ridge maximal span may be other than a diameter in the case of a non-circular orifice ridge structure.

Figure 3:
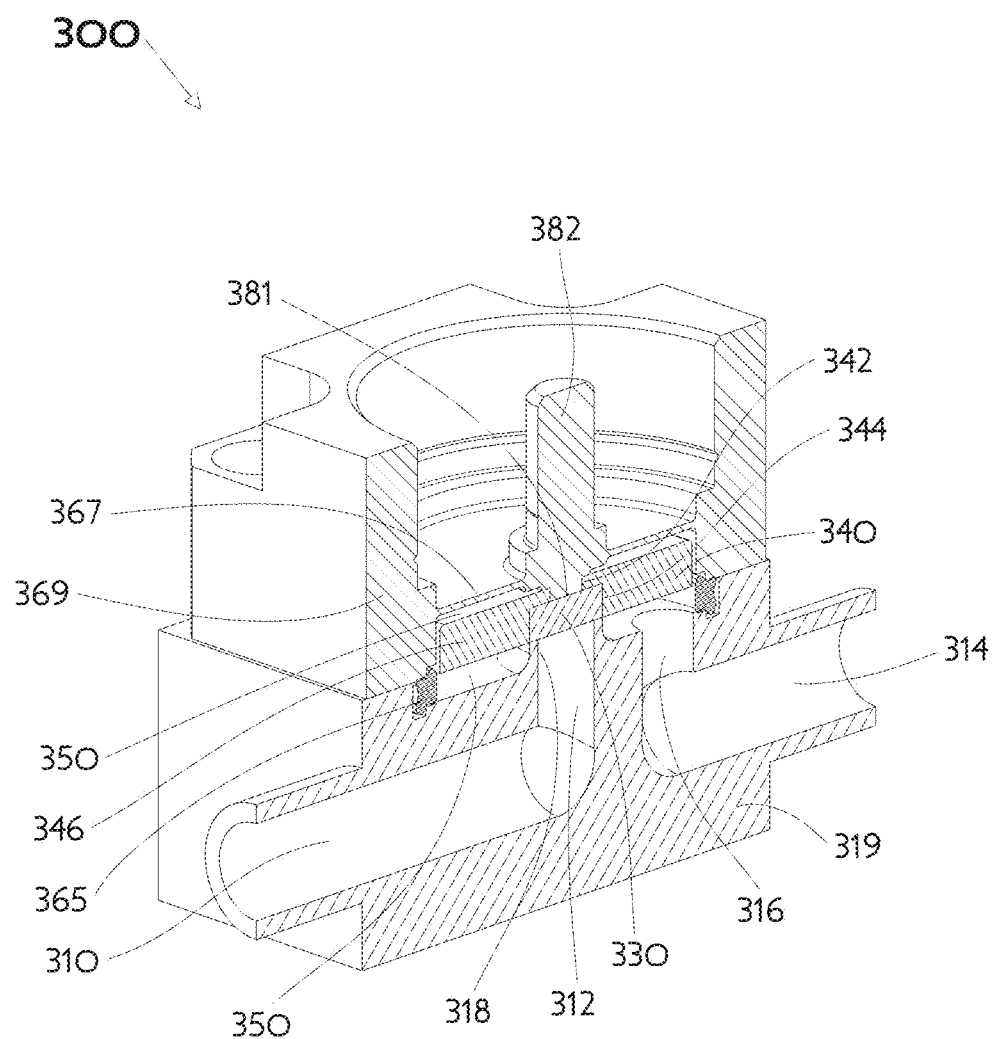
FIG. 3 is a cross-sectioned perspective view of a representative valve with a control plate having a soft corrosion resistant alloy insert and a small orifice ridge of maximal span.
Figure 4:
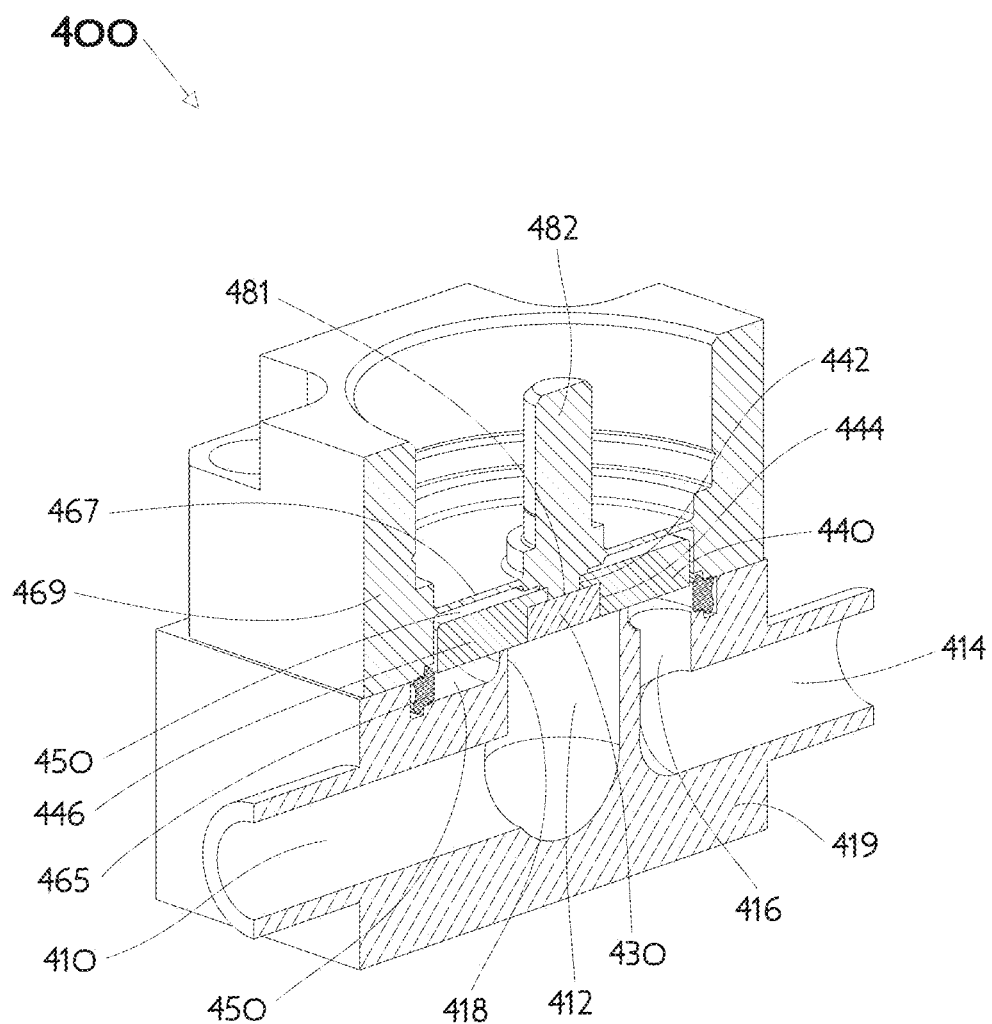
FIG. 4 is a cross-sectioned perspective view of a representative valve with a control plate having a soft corrosion resistant alloy body and a large orifice ridge of typical span.
Figure 5:
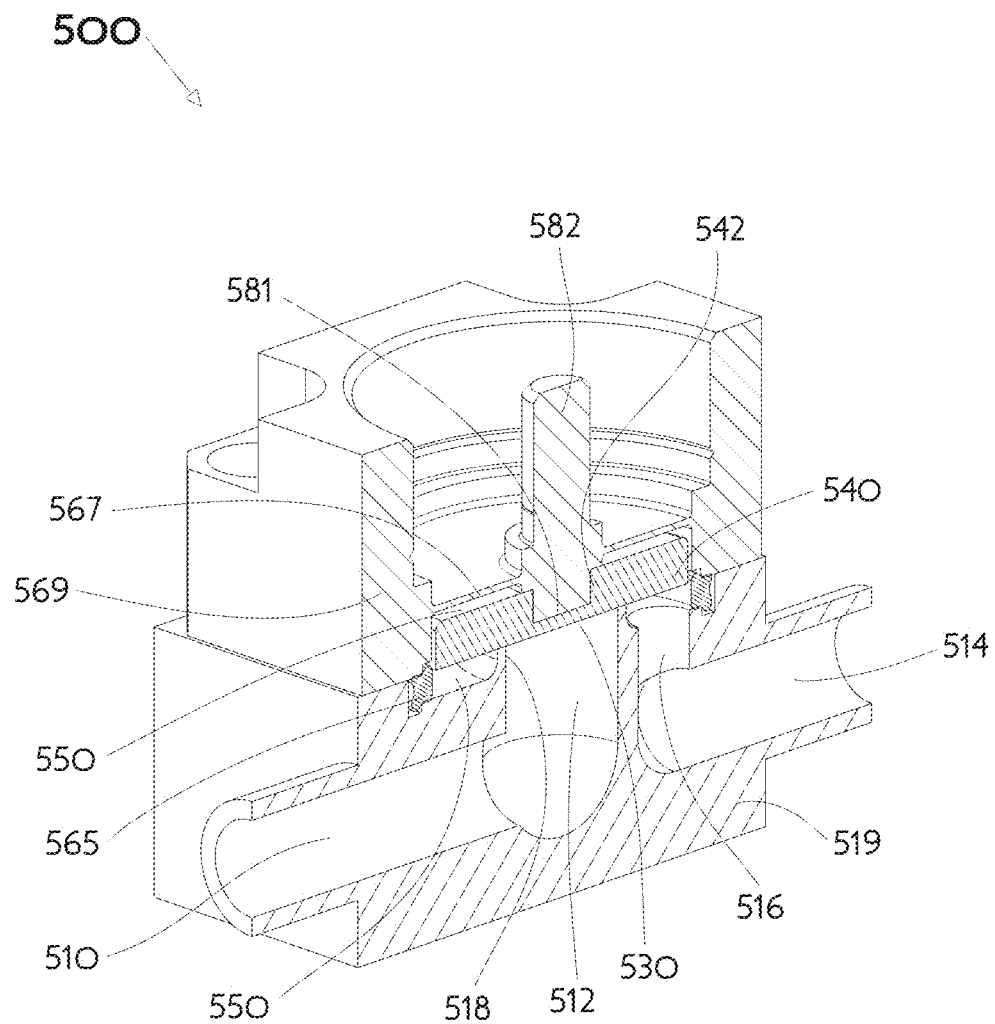
FIG. 5 is a cross-sectioned perspective view of another representative valve with an alternate design soft corrosion resistant alloy control plate.

In addition to concerns discussed above regarding moisture absorption by polymer materials, it is also known that many gases will diffuse through polymers. Although the diffusion occurs at a very low rate it may amount to detectable quantities which are considered undesirable or even problematic. Additionally, in nuclear science applications a problematic diffusion of radioactive gas may also lead to a simultaneous destruction of the polymer material. A valve having metal to metal sealing is free of these concerns but it is difficult to achieve good shut-off performance in such designs. Moreover, cold welding between very clean valve metallic components can be a potential problem. One design approach is to make the valve of two dissimilar metallic materials to avoid cold welding and also provide dissimilar hardness to enhance shut-off. FIG. 3, FIG. 4, and FIG. 5 illustrate embodiments of a control plate for implementing a metal to metal valve design.

The polymer material insert 230 includes a planar first surface configured to sealingly engage the planar upper end of the orifice ridge 218.

FIG. 3 illustrates a representative example of a proportional control valve 300 using diaphragm sealing and also having a control plate 340 which abuts an orifice ridge 318 surrounding a central fluid conduit opening 312. The proportional control valve 300 comprises a valve body 319 having a first fluid conduit 310 and a second fluid conduit 314, each of which communicates fluid to or from a valve chamber 350, and a valve bonnet 369 sealed to the valve body 319 by a gasket 365, the bonnet 369 having a diaphragm 367 allowing movement of the attached control plate 340 within the valve chamber 350. The manner of controlling fluid flow may be further understood by considering the fluid conduit opening 312, in fluid communication with the first fluid conduit 310 and surrounded by the orifice ridge 318, whereby at least a portion of the control plate 340 may be moved toward or away from the orifice ridge 318 to create a small clearance control gap (not shown) through which fluid may controllably flow. The controllable fluid flow may transit into the valve chamber 350 from whence it may exit through an offset fluid conduit opening 316 in fluid communication with the second fluid conduit 314. In the present example valve 300, an actuator (not shown) may apply a retracting force to a control shaft 382 to deflect the diaphragm 367 and thereby modulate the conductance through the valve by changing the control gap. In the present FIG. 3 illustration the valve 300 is completely closed in a no-flow condition so there is no control gap shown.

In the representative proportional control valve 300 enhancing shut-off performance is achieved by creating a control plate 340 comprising a metallic control plate body 346 and a metallic insert 330 of less hardness than the orifice ridge 318. The orifice ridge 318 may be considered as having a "maximal span" relative to the metallic insert 330 in that the orifice ridge engages the metallic insert adjacent an outer periphery of the insert. The metallic control plate body 346 of the control plate 340 can be machined as a flat disk having a central thru-hole 342 with a counterbore 344 on the side intended to face the central fluid conduit opening 312. The counterbore 344 will enable the metallic control plate body 346 to function as a seat housing whereby an annealed, or preferably fully annealed, corrosion resistant metallic alloy insert 330 may be retained therein to provide a more compliant sealing material. In manufacturing the illustrated valve design 300 the control plate body 346 is placed onto a shank 381, projecting from the control shaft 382 and diaphragm 367, which passes through the central thru-hole 342. The shank 381 and control plate body 346 may be welded together at the central thru-hole 342 interface using electron beam, laser, TIG, or any equivalent welding process. Any resulting minor weld bead excess may be machined off to match the bottom of the counterbore 344. The annealed, or fully annealed, corrosion resistant metallic alloy insert 330 may subsequently be placed into the counterbore 344 and held in place by using electron beam, laser, TIG, or any equivalent welding process around the outer periphery of the insert 330 and the inner diameter of the counterbore 344. Alternatively, an interference fit between the outer diameter of the metallic alloy insert 330 and the inner diameter of the counterbore 344 may be considered sufficient to retain the insert 330. The complete assembly may then undergo final finishing for flatness (by lapping, or single point diamond turning, for example) as needed for good valve function. This design approach is especially advantageous for valves having an orifice ridge of about 4 mm diameter or less. In a typical application the orifice ridge 318 will be made of one alloy while the metallic alloy seat insert 330 will be made from a different alloy. One usual choice of materials is type 316 stainless for the orifice ridge 318 and a corrosion resistant nickel alloy (such as Hastelloy® C-22® available from Haynes International) for the insert 330.

The metallic insert 330 includes a planar first surface configured to sealingly engage the planar upper end of the orifice ridge 318.

FIG. 4 illustrates a representative example of a proportional control valve 400 using diaphragm sealing and also having a control plate 440 which abuts an orifice ridge 418 surrounding a central fluid conduit opening 412. The proportional control valve 400 comprises a valve body 419 having a first fluid conduit 410 and a second fluid conduit 414, each of which communicates fluid to or from a valve chamber 450, and a valve bonnet 469 sealed to the valve body 419 by a gasket 465, the bonnet 469 having a diaphragm 467 allowing movement of the attached control plate 440 within the valve chamber 450. The manner of controlling fluid flow may be further understood by considering the fluid conduit opening 412, in fluid communication with the first fluid conduit 410 and surrounded by an orifice ridge 418, whereby at least a portion of the control plate 440 may be moved toward or away from the orifice ridge 418 to create a small clearance control gap (not shown) through which fluid may controllably flow. The controllable fluid flow may transit into the valve chamber 450 from whence it may exit through an offset fluid conduit opening 416 in fluid communication with the second fluid conduit 414. In the present example valve 400, an actuator (not shown) may apply a retracting force to a control shaft 482 to deflect the diaphragm 467 and thereby modulate the conductance through the valve by changing the control gap. In the present FIG. 4 illustration the valve 400 is completely closed in a no-flow condition so there is no control gap shown.

In the representative proportional control valve 400 enhancing shut-off performance is achieved by creating a control plate 440 comprising a metallic control plate body 446 of less hardness than the orifice ridge 418 and a metallic cover piece 430. The orifice ridge 418 may be considered as having a "typical span" relative to the control plate body 446 in that the orifice ridge engages the control plate body adjacent a more central region of the control plate body 446 located between an inner periphery and an outer periphery of the control plate body 446. The metallic control plate body 446 of the control plate 440 can be machined from an annealed, or preferably fully annealed, corrosion resistant alloy as a flat disk having a central thru-hole 442 with a counterbore 444 on the side intended to face the central fluid conduit opening 412. The counterbore 444 enables the attachment process by providing access to the moveable valve elements. In manufacturing the illustrated valve design 400 the control plate body 446 is placed onto a shank 481, projecting from the control shaft 482 and diaphragm 467, which passes through the central thru-hole 442. The shank 481 and control plate body 446 may be welded together at the central thru-hole 442 interface using electron beam, laser, TIG, or any equivalent welding process. Any resulting minor weld bead excess may be machined off to match the bottom of the counterbore 444. A suitable metallic cover piece 430 may subsequently be placed into the counterbore 444 and held in place by using electron beam, laser, TIG, or any equivalent welding process around the outer periphery of the cover piece 430 and the inner diameter of the counterbore 444. Alternatively, an interference fit between the outer diameter of the metallic cover piece 430 and the inner diameter of the counterbore 444 may be considered sufficient to retain the cover piece 430. The complete assembly may then undergo final finishing for flatness (by lapping, or single point diamond turning, for example) as needed for good valve function. This design approach is especially advantageous for valves having an orifice ridge maximal span greater than about 4 mm. It should be appreciated the orifice ridge maximal span may be other than a diameter in the case of a non-circular orifice ridge structure. In a typical application the orifice ridge 418 will be made of one alloy while the metallic control plate body 446 will be made from a different alloy. One usual choice of materials is type 316 stainless for the orifice ridge 418 and a corrosion resistant nickel alloy (such as Hastelloy® C-22® available from Haynes International) for the control plate body 446. The metallic cover piece 430 may be made from the same material as either the orifice ridge 418 or the control plate 440, or from yet another different alloy.

The cover piece 430 and the control plate body 446 are provided as separate components in FIG. 4 to allow for improved welding of the control plate 440 to the shank 481. First, the control plate body 446 is welded to the shank 481. Next the cover piece 430 is welded to the control plate body 446. Then cover piece 430 and the control plate body 446 can undergo finishing for flatness (e.g. by lapping, or single point diamond turning, or another method).

In some embodiments, the structure of FIG. 4 could be provided without the cover piece 430, because the cover piece 430 is not used to engage the orifice ridge 418.

The term cover piece, as used herein, is used to describe an insert in which the insert itself is not used to sealingly engage the orifice ridge.

The control plate body 446 includes a planar first surface configured to sealingly engage the planar upper end of the orifice ridge 418.

FIG. 5 illustrates a representative example of a proportional control valve 500 using diaphragm sealing and also having a control plate 540 which abuts an orifice ridge 518 surrounding a central fluid conduit opening 512. The proportional control valve 500 comprises a valve body 519 having a first fluid conduit 510 and a second fluid conduit 514, each of which communicates fluid to or from a valve chamber 550, and a valve bonnet 569 sealed to the valve body 519 by a gasket 565, the bonnet 569 having a diaphragm 567 allowing movement of the attached control plate 540 within the valve chamber 550. The manner of controlling fluid flow may be further understood by considering the fluid conduit opening 512, in fluid communication with the first fluid conduit 510 and surrounded by an orifice ridge 518, whereby at least a portion of the control plate 540 may be moved toward or away from the orifice ridge 518 to create a small clearance control gap (not shown) through which fluid may controllably flow. The controllable fluid flow may transit into the valve chamber 550 from whence it may exit through an offset fluid conduit opening 516 in fluid communication with the second fluid conduit 514. In the present example valve 500 an actuator (not shown) may apply a retracting force to a control shaft 582 to deflect the diaphragm 567 and thereby modulate the conductance through the valve by changing the control gap. In the present FIG. 5 illustration the valve 500 is completely closed in a no-flow condition so there is no control gap shown.

The metallic control plate 540 can be machined from an annealed or preferably fully annealed corrosion resistant alloy, of less hardness than the orifice ridge, as a flat disk having a blind central counterbore 542 on the side intended to face the diaphragm 567. In manufacturing the illustrated valve design 500 the control plate 540 may be press fit onto a shank 581, projecting from the control shaft 582 and diaphragm 567. Alternatively, the shank 581 and control plate 540 may be welded together using electron beam, laser, or any equivalently energetic welding process suitable to penetrate the thin central portion 530 of the control plate 540 and fuse it to the shank 581. It should be noted that in the embodiment depicted in FIG. 5, the shank 581 may extend deeper into the control plate 540 than, for example, the embodiments depicted in FIGS. 3 and 4 to aid in the welding process. The thin central portion 530 may further include a detent or other type of weld preparation (not shown) to reduce the amount of material in the central portion 530 of the control plate to minimize the amount of energy or time needed to weld the central portion 530 of the control plate 540 to the shank 581. Any resulting minor weld bead excess may be machined off and the complete assembly may then undergo final finishing for flatness (by lapping, or single point diamond turning, for example, or another method) as needed for good valve function. This design approach is especially advantageous due to the lesser number of machined pieces and its suitability for use with a variety of orifice ridge sizes and shapes. It should be appreciated the orifice ridge maximal span may be other than a diameter in the case of a non-circular orifice ridge structure and an ensemble plurality of coplanar orifice ridges is also contemplated. In a typical application the orifice ridge 518 will be made of one alloy while the metallic control plate 540 will be made from a different alloy. One usual choice of materials is type 316 stainless for the orifice ridge 518 and a corrosion resistant nickel alloy (such as Hastelloy® C-22® available from Haynes International) for the control plate 540.

The control plate 540 includes a planar first surface configured to sealingly engage the planar upper end of the orifice ridge 518

Figure 6A:
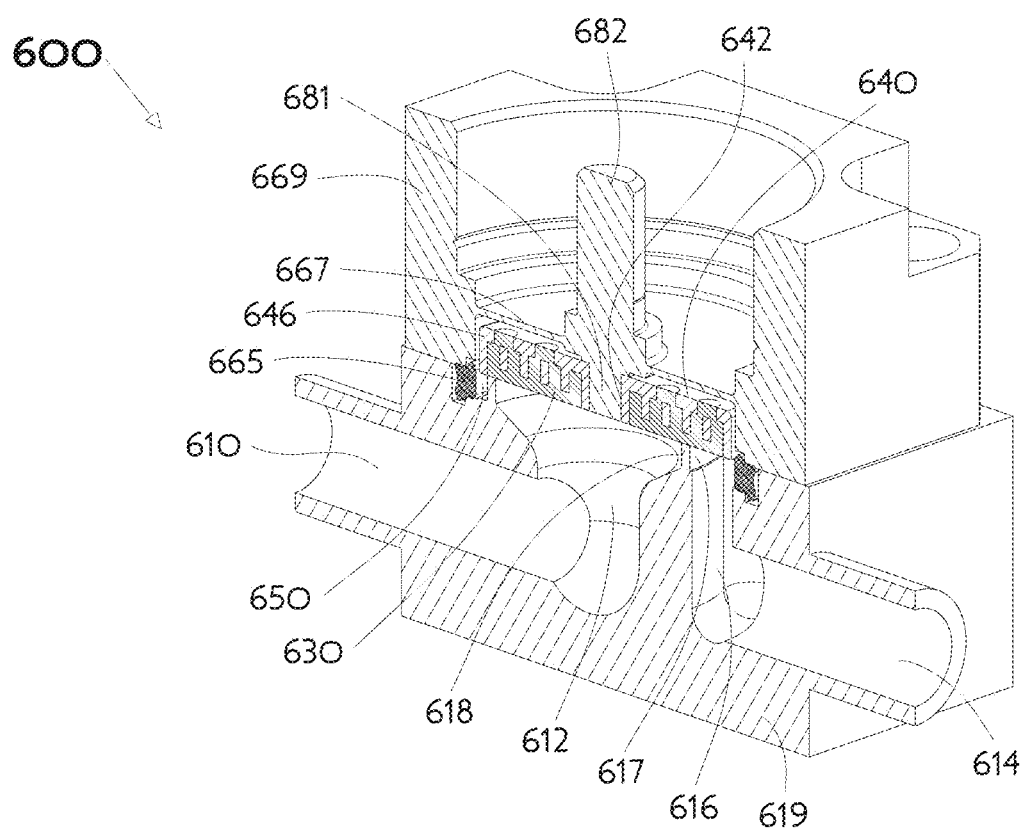
FIG. 6A is a cross-sectioned perspective view of another representative valve with an alternate design polymer insert control plate.
Figure 6B:
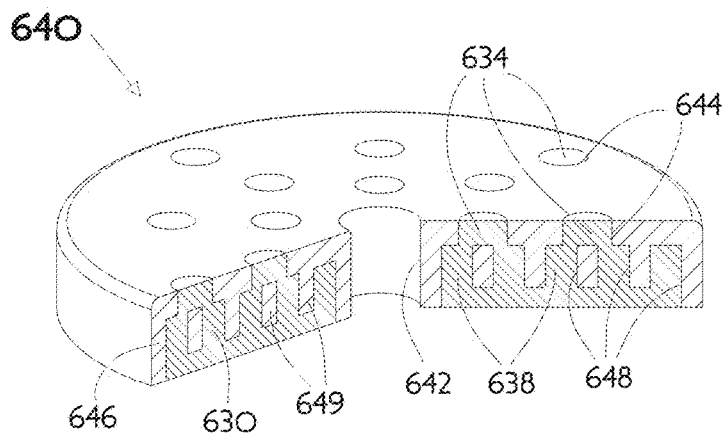
FIG. 6B is an enlarged perspective section view of the control plate illustrated in FIG. 6A to further illustrate construction of the polymer material insert.

FIG. 6A and FIG. 6B illustrate a representative example of a proportional control valve 600 using diaphragm sealing and also having a control plate 640 which abuts an orifice ridge 618 surrounding an inner fluid conduit opening 612. The proportional control valve 600 comprises a valve body 619 having a first fluid conduit 610 and a second fluid conduit 614, each of which communicates fluid to or from a valve chamber 650, and a valve bonnet 669 sealed to the valve body 619 by a gasket 665, the bonnet 669 having a diaphragm 667 allowing movement of the attached control plate 640 within the valve chamber 650. The manner of controlling fluid flow may be further understood by considering the inner fluid conduit opening 612, in fluid communication with the first fluid conduit 610 and surrounded by the orifice ridge 618, whereby at least a portion of the control plate 640 may be moved toward or away from the orifice ridge 618 to create a small clearance control gap (not shown) through which fluid may controllably flow. The controllable fluid flow may transit into the valve chamber 650 from whence it may exit through an outer fluid conduit opening 616 in fluid communication with the second fluid conduit 614. In the present example valve 600, an actuator (not shown) may apply a retracting force to a control shaft 682 to deflect the diaphragm 667 and thereby modulate the conductance through the valve by changing the control gap. In the present FIG. 6A illustration the valve 600 is completely closed in a no-flow condition so there is no control gap shown.

Figure 6C:
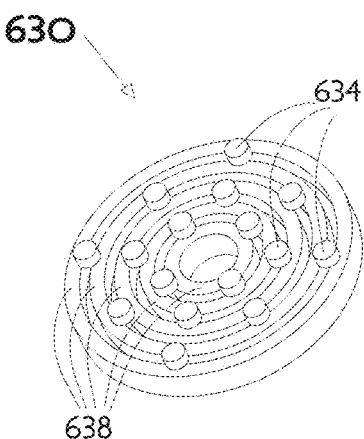
FIG. 6C is a view of a molded polymer insert without the metal control plate body, to further illustrate the geometry of the polymer material insert.

In the representative proportional control valve 600 the goal of reducing polymer content is achieved by creating a control plate 640 comprising a metallic control plate body 646 and a molded insert 630 of polymer material. As may be seen in FIG. 6B, the metallic control plate body 646 of the control plate 640 can be machined as a flat disk having a central thru-hole 642 and a plurality of concentric ring-shaped grooves 648 on the side intended to face the inner fluid conduit opening 612. The grooves 648 enable the metallic control plate body 646 to function as a seat housing whereby a polymer material insert 630 may be retained therein, as will be further explained, to provide a more compliant sealing material of reduced volume. The remaining metal 649 between the concentric grooves 648 in the control plate body 646 provides meaningful reduction of the total volume of the molded insert 630. Vent holes 644, defined in the flat back side of the disk facing away from the inner fluid opening 612, are made centered between the grooves 648 deep enough with sufficient diameter to intersect the bottoms of adjacent grooves 648 while leaving the majority of the remaining metal 649 intact. In manufacturing the illustrated control plate 640 the polymer material insert 630 may be formed by compression molding (e.g. starting with polychlorotrifluoroethene (PCTFE) powder and polymerizing under the effect of heat and pressure) directly into the control plate body 646 by known methods. During the molding process bridges 634 of polymer material will surround parts of the remaining metal 649 and fill the vent holes 644. The polymer material bridges 634 surrounding the remaining metal 649 thus lock the molded polymer insert 630 into the metallic control plate body 646. FIG. 6C shows a perspective view of a molded polymer insert 630, with the metallic control plate body 646 not shown for the purpose of illustrating the geometry of the molded polymer insert 630. The molded polymer insert 630 has a plurality of annular ridges 638, that are complementary with the grooves 648 and which fill the grooves 648 that are defined in the control plate body 646.

The control plate 640 comprising the metallic control plate body 646 including the molded polymer insert 630 may be attached to a shank 681, projecting from the control shaft 682 and diaphragm 667, by press fit into the central thru-hole 642. Alternatively, prior to the above described molding, the control plate body 646 may first be placed onto the shank 681 and welded together at the central thru-hole 642 interface using electron beam, laser, TIG, or any equivalent welding process. Any resulting minor weld bead excess may be machined off the control plate body 646 surface before molding the insert 630 into the control plate body 646. The process sequence choice will depend upon practitioners' preference in compression molding techniques. The complete assembly may then undergo final finishing for flatness (by lapping, for example) as needed for good valve function. This design approach is especially advantageous for use with valve bodies having a variety of orifice ridge sizes and shapes. It should be appreciated the orifice ridge maximal span may be other than a diameter in the case of a non-circular orifice ridge structure. Careful examination of the illustrated example of FIG. 6A will reveal the orifice ridge 618 is circular but placed off geometric center of the diaphragm 667 and control plate 640 to accommodate a correspondingly large non-circular outer fluid opening 617 because the orifice ridge is so large in diameter.

Figure 6D:
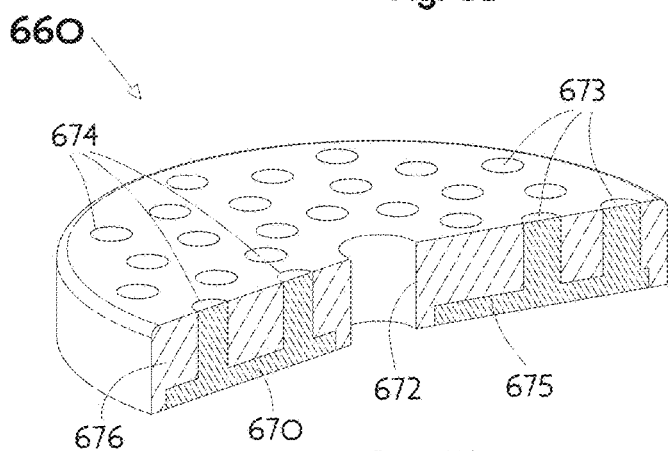
FIG. 6D is an enlarged perspective section view of an alternate control plate for use in the valve illustrated in FIG. 6A to further illustrate construction of the polymer material insert.
Figure 6E:
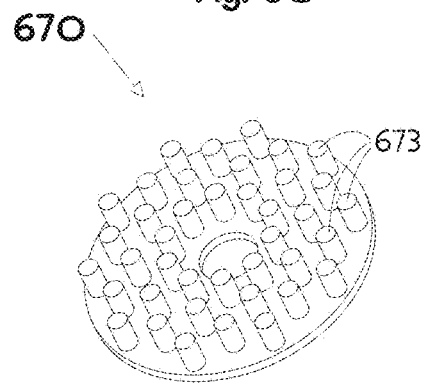
FIG. 6E is a view of a molded polymer insert without the metal control plate body, to further illustrate the geometry of the polymer material insert

An alternate control plate 660 suitable for use in the representative proportional control valve 600 is illustrated in FIG. 6D. A metallic control plate body 676 of the control plate 660 can be machined as a flat disk having a central thru-hole 672 and a wide shallow ring-shaped groove 675 on the side intended to face the inner fluid conduit opening 612. The groove 675 enables the metallic control plate body 676 to function as a seat housing whereby a polymer material insert 670 may be retained therein, as will be further explained, to provide a more compliant sealing material of reduced volume. A plurality of thru-holes 674 defined in the flat back side of the disk facing away from the inner fluid opening 612 penetrate the wide shallow ring-shaped groove 675. In manufacturing the illustrated control plate 660 the polymer material insert 670 may be formed by compression molding (e.g. starting with PCTFE powder and polymerizing under the effect of heat and pressure) directly into the control plate body 676 by known methods. During the molding process a plurality of columns 673 of polymer material will fill the thru-holes 674 thereby frictionally locking the polymer material into the groove 675 defined in the metallic control plate body 676. The geometry of the polymer material insert 670 that is formed by the molding process is shown in FIG. 6E, with the control plate body 676 not shown for illustration purposes. The control plate 660 comprising the metallic control plate body 676 including the molded polymer insert 670 may be attached to a shank 681, projecting from the control shaft 682 and diaphragm 667, by press fit into the central thru-hole 672, or attached in another manner as previously described.

Figure 6F:
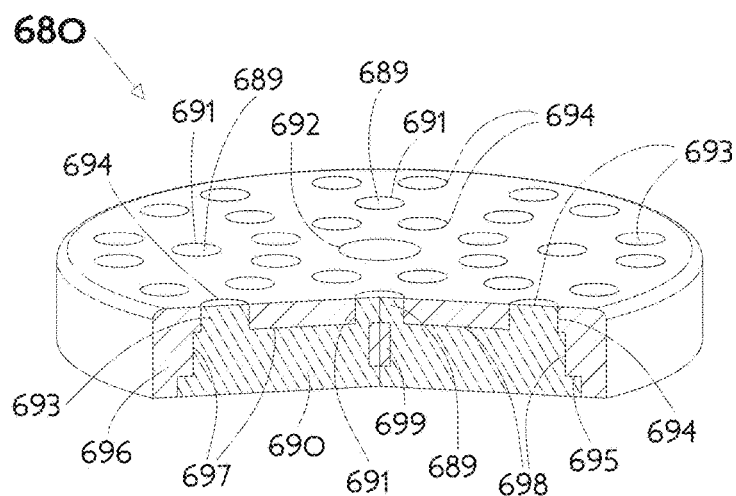
FIG. 6F is an enlarged perspective section view of another alternate control plate for use in the valve illustrated in FIG. 6A to further illustrate construction of the polymer material insert.
Figure 6G:
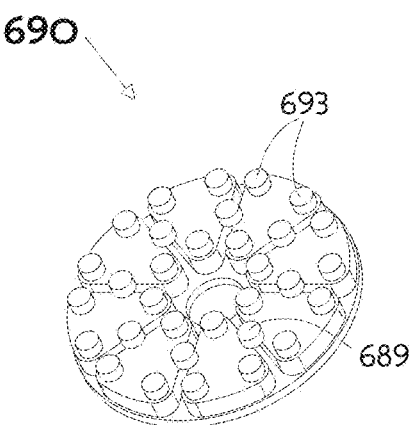
FIG. 6G is a view of a molded polymer insert without the metal control plate body, to further illustrate the geometry of the polymer material insert.

Another alternate control plate 680 suitable for use in the representative proportional control valve 600 is illustrated in FIG. 6F. A metallic control plate body 696 of the control plate 680 can be machined as a flat disk having a central thru-hole 692, a wide shallow counterbore 695, and a plurality of wedge-shaped (being approximately circular sectors) cavities 697,698 cut into the bottom of the counterbore 695 on the side intended to face the inner fluid conduit opening 612. The counterbore 695 and plurality of cavities 697,698 enable the metallic control plate body 696 to function as a seat housing whereby a polymer material insert 690 may be retained therein, as will be further explained, to provide a more compliant sealing material of reduced volume. The metal between the between the plurality of wedge-shaped cavities 697,698, in the wide shallow counterbore 695 of the control plate body 696, form radial ribs 699. Vent holes 691, defined in the flat back side of the disk facing away from the inner fluid opening 612, are made centered over the radial ribs 699 deep enough with sufficient diameter to intersect the bottoms of adjacent wedge-shaped cavities 697,698 while leaving the majority of the remaining metal rib 699 intact. A plurality of thru-holes 694, also defined in the flat back side of the disk facing away from the inner fluid opening 612, penetrate the bottom of each of the wedge-shaped cavities 697,698. In manufacturing the illustrated valve design 600 the polymer material insert 690 may be formed by compression molding (e.g. starting with PCTFE powder and polymerizing under the effect of heat and pressure) directly into the control plate body 696 by known methods. During the molding process polymer material will fill the thru-holes 694 and surround the metal radial ribs 699 to fill the vent holes 691. The molded polymer material forms bridges 689 to fill the vent holes and posts 693 to fill the thru-holes 694. The molded polymer material also forms wedge portions of the insert 690 to fill respective wedge-shaped cavities 697, 698. The polymer material surrounding the metal ribs 699 thus lock the molded insert 690 into the metallic control plate body 696. The geometry of the polymer material insert 690 that is formed by the molding process is shown in FIG. 6G, with the control plate body 696 not shown for illustration purposes. The control plate 680 comprising the metallic control plate body 696 including the molded polymer insert 690 may be attached to a shank 681, projecting from the control shaft 682 and diaphragm 670, by press fit into the central thru-hole 692, or attached in another manner as previously described.

In each of FIGS. 6A-6G, the respective polymer material insert 630, 670, 690 includes a planar first surface configured to sealingly engage the planar upper end of the orifice ridge 618. It should be appreciated that the specific sizes of features shown in FIGS. 6A-6G may be varied and are not necessarily drawn to scale.

Referring again to FIG. 2, the ring-shaped insert 230 could be molded in the control plate body 246 of the control plate 240 and secured within the control plate body 246 of the control plate 240 by retaining features such as the structure of FIGS. 6A-6G. That is, for example, the ring-shaped insert 230 could have columns that are positioned in thru-holes defined in the control plate body 246, posts that are positioned in thru-holes defined in the control plate body 246, and/or bridges that are positioned in vent holes defined in the control plate body in a manner similar to that described with respect to FIGS. 6A-6G.

The counterbores and grooves described above are examples of recesses that can be defined in a control plate body. In some embodiments, an insert can be secured in another type of recess that is defined in the control plate body.

In some embodiments, a retention mechanism is used to retain an insert in one or more counterbores and/or one or more grooves defined in a control plate body. Some examples of a retention mechanism include a retaining ring located at an outer periphery of the insert, an inner retaining ring located at an inner periphery of the insert and an outer retaining ring located at an outer periphery of the insert, a post, a column, a bridge, and a weld. Other retention mechanisms are possible. It should be appreciated that although embodiments of the present disclosure have been primarily described with respect to diaphragm sealed valves in which a control plate is disposed below and attached to or integrally formed with the diaphragm, aspects of the present disclosure may be readily adapted for use with other types of valves, such as bellows sealed valves similar to those described in U.S. Pat. No. 3,295,191. Moreover, although embodiments of the present disclosure have been described with respect to control valves in which an actuator is used to move an orifice ridge sealing surface of the control plate toward and away from an orifice ridge, this movement need not need not be uniform across the orifice ridge sealing surface of the control plate. For example, embodiments of the present disclosure may readily be used with a valve stroke amplification mechanism, such as disclosed in US Patent Publication No. US2016/0138730 A1, in which an amplifier disc may be used to effect a wedge shaped gap having a higher conductance than would otherwise be obtained.

Although the embodiments depicted in FIGS. 1-6A are all depicted as showing a valve bonnet body 169, 269, 369, 469, 569, 669 in which the diaphragm 167, 267, 367, 467, 567, 667 is integrally formed with the bonnet body, it should be appreciated that the present invention is not so limited. Indeed, embodiments of the present disclosure encompass diaphragms that are stamped, punched, or cut out of a piece of sheet metal that is later attached (for example, by welding) to a bonnet body, as well as those in which the diaphragm and bonnet body are integrally formed from a single block of starting material, as shown herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A valve bonnet for use with a control valve body, the control valve body having a fluid conduit opening surrounded by a planar orifice ridge, the valve bonnet comprising:

a bonnet body having a valve diaphragm, a control shaft, and a valve control plate body disposed therewithin;

the valve diaphragm being in sealing engagement with the bonnet body at an outer periphery of the valve diaphragm, the valve diaphragm being one of integrally formed with the bonnet body and welded to the bonnet body;

the control shaft being secured to a top of the valve diaphragm, the control shaft having a shank projecting from the control shaft in a direction away from a bottom of the valve diaphragm;

the valve control plate body being secured to the shank, the valve control plate body being formed from a first material having a first hardness, the valve control plate body having a first surface configured to face toward the fluid conduit opening and an opposed second surface facing toward the valve diaphragm, the second surface being adjacent the valve diaphragm, the shank penetrating the second surface, the valve control plate body having at least one recess defined in only the first surface of the valve control plate body to receive a valve seat insert and a plurality of holes extending through the valve control plate body within the at least one recess; and the valve seat insert being formed from a second material having a second hardness that is less than the first hardness, the valve seat insert having a first surface configured to face toward the fluid conduit opening and sealingly engage the planar orifice ridge, the valve seat insert being molded into the at least one recess and including a plurality of at least one of posts, columns, and bridges formed in the valve seat insert that extend into and fill the plurality of holes defined in the valve control plate body, and lock the valve seat insert into the valve control plate body.

2. The valve bonnet of claim 1, wherein the valve seat insert is configured to engage a planar orifice ridge that is circular.

3. The valve bonnet of claim 1, wherein the valve diaphragm is formed integrally with the bonnet body, and the control shaft is integrally formed with the valve diaphragm.

4. The valve bonnet of claim 1, wherein the valve diaphragm is formed separately from the bonnet body, and is welded to the bonnet body.

5. The valve bonnet of claim 1, wherein the at least one recess includes a trepanned groove defined in the valve control plate body, and the valve seat insert fills the trepanned groove.

6. The valve bonnet of claim 1, wherein the first surface of the valve seat insert is planar.

7. The valve bonnet of claim 1, wherein the at least one recess includes a plurality of recesses, at least one of the plurality of holes is made centered over a rib between two adjacent recesses of the plurality of recesses deep enough with sufficient diameter to intersect bottoms of the two adjacent recesses while having a portion of the rib intact, and the valve seat insert is molded into the plurality of recesses and the at least one of the plurality of holes to surround the portion of the rib so that the valve seat insert is locked in the valve control plate body by the portion of the rib.

8. A control valve comprising:
 a valve body having a first fluid conduit terminating at a first fluid conduit opening, a second fluid conduit commencing at a second fluid conduit opening, and an orifice ridge surrounding the first fluid conduit opening, one of the first fluid conduit and the second fluid conduit being a fluid inlet conduit, and the other of the first fluid conduit and the second fluid conduit being a fluid outlet conduit; and
 a valve bonnet, the valve bonnet including
  a bonnet body secured to the valve body, the bonnet body having a valve diaphragm, a control shaft, and a valve control plate body disposed therewithin;
  the valve diaphragm being in sealing engagement with the bonnet body at an outer periphery of the valve diaphragm, the valve diaphragm being one of integrally formed with the bonnet body and welded to the bonnet body;
  the control shaft being secured to a top of the valve diaphragm, and a shank projecting from the control shaft in a direction away from a bottom of the valve diaphragm;
  the valve control plate body being secured to the shank, the valve control plate body being formed from a first material having a first hardness, the valve control plate body having a first surface configured to face toward the first fluid conduit opening and an opposed second surface facing toward the valve diaphragm, the second surface being adjacent the valve diaphragm, the shank penetrating the second surface, the valve control plate body having at least one recess defined in the first surface of the valve control plate body and a plurality of holes extending through the valve control plate body within the at least one recess; and
  a valve seat insert formed from a second material having a second hardness that is less than the first hardness, the valve seat insert having a first surface configured to face toward the first fluid conduit opening and sealingly engage the orifice ridge, the valve seat insert being molded into the at least one recess and including a plurality of at least one of posts, columns, and bridges formed in the valve seat insert that extend into and fill the plurality of holes defined in the valve control plate body, and lock the valve seat insert into the valve control plate body.

9. The control valve of claim 8, wherein the orifice ridge is circular.

10. The control valve of claim 8, wherein the at least one recess includes is a trepanned groove defined in the valve control plate body, and the valve seat insert fills the trepanned groove.

11. The control valve of claim 8, wherein the valve diaphragm is formed integrally with the bonnet body, and the control shaft is integrally formed with the valve diaphragm.

12. The control valve of claim 8, wherein the valve diaphragm is formed separately from the bonnet body, and is welded to the bonnet body.

13. The control valve of claim 8, wherein the first surface of the valve seat insert that sealingly engages the orifice ridge is planar.

14. The control valve of claim 8, wherein the first material is a metal.

15. The control valve of claim 14, wherein the second material is a polymer.

16. The control valve of claim 8, wherein the second material is a polymer.

17. The control valve of claim 8, wherein at least one recess includes a plurality of recesses, at least one of the plurality of holes is made centered over a rib between two adjacent recesses of the plurality of recesses deep enough with sufficient diameter to intersect bottoms of the two adjacent recesses while having a portion of the rib intact, and the valve seat insert is molded into the plurality of recesses and the at least one of the plurality of holes to surround the portion of the rib so that the valve seat insert is locked in the valve control plate body by the portion of the rib.

* * * * *